United States Patent
Levy et al.

(10) Patent No.: US 12,386,115 B2
(45) Date of Patent: Aug. 12, 2025

(54) COMPOUND-SEMICONDUCTOR WAVEGUIDES WITH AIRGAP CLADDING

(71) Applicant: GlobalFoundries U.S. Inc., Malta, NY (US)

(72) Inventors: Mark Levy, Williston, VT (US); Siva P. Adusumilli, South Burlington, VT (US); Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 257 days.

(21) Appl. No.: 17/985,223

(22) Filed: Nov. 11, 2022

(65) Prior Publication Data

US 2024/0159962 A1 May 16, 2024

(51) Int. Cl.
*G02B 6/122* (2006.01)
*G02B 6/13* (2006.01)
*G02B 6/12* (2006.01)

(52) U.S. Cl.
CPC .............. *G02B 6/122* (2013.01); *G02B 6/13* (2013.01); *G02B 2006/12078* (2013.01)

(58) Field of Classification Search
CPC ........ G02B 6/131; G02B 6/122; G02B 6/136; G02B 2006/12061
See application file for complete search history.

(56) References Cited

U.S. PATENT DOCUMENTS

| | | | |
|---|---|---|---|
| 6,470,130 B1 | 10/2002 | Walker et al. | |
| 7,773,840 B2 | 8/2010 | Kwakernaak et al. | |
| 9,059,252 B1* | 6/2015 | Liu | G02B 6/12004 |
| 10,156,676 B1* | 12/2018 | Shank | H01L 31/1136 |
| 2004/0218259 A1 | 11/2004 | Hui et al. | |
| 2017/0097468 A1* | 4/2017 | Czornomaz | G02B 6/13 |
| 2022/0075130 A1 | 3/2022 | Krasulick et al. | |
| 2022/0146686 A1 | 5/2022 | Lin et al. | |
| 2022/0171123 A1 | 6/2022 | Levy et al. | |

FOREIGN PATENT DOCUMENTS

| | | |
|---|---|---|
| CN | 111785818 A | 10/2020 |
| EP | 2544319 B1 | 3/2015 |
| KR | 20150066148 A | 6/2015 |
| WO | 2009134691 A1 | 11/2009 |

OTHER PUBLICATIONS

Peter F. Satterthwaite et al., "High Responsivity, Low Dark Current Ultraviolet Photodetectors Based on Two-Dimensional Electron Gas Interdigitated Transducers." ACS Photonics 2018, 5, 11, 4277-4282, Publication Date: Oct. 1, 2018, https://doi.org/10.1021/acsphotonics.8b01169.

(Continued)

*Primary Examiner* — Eric Wong
(74) *Attorney, Agent, or Firm* — Thompson Hine LLP; Anthony Canale

(57) ABSTRACT

Structures for a waveguide and methods of forming a waveguide. The structure comprises a substrate, a waveguide core comprising a compound semiconductor material, and a layer disposed on the substrate. The layer comprises the compound semiconductor material, and the layer includes a cavity positioned beneath the waveguide core.

20 Claims, 4 Drawing Sheets

(56) References Cited

OTHER PUBLICATIONS

Qifeng Lyu et al., "High gain and high ultraviolet/visible rejection ratio photodetectors using p-GaN/AlGaN/GaN heterostructures grown on Si." Applied Physics Letters, vol. 117, Issue 7, 071101; Aug. 17, 2020; https://doi.org/10.1063/5.0011685.

M. Martens et al., "High gain ultraviolet photodetectors based on AlGaN/GaN heterostructures for optical switching." Applied Physics Letters, vol. 98, Issue 21, 211114; May 26, 2011; https://doi.org/10.1063/1.3595303.

D.A. Stocker and E.F. Schubert, "Crystallographic wet chemical etching of GaN." Applied Physics Letters, vol. 73, Issue 18, 2654, Dec. 14, 1998; https://doi.org/10.1063/1.122543.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al. "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2.

Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper M5A.2.

Y. Bian et al., "3D Integrated Laser Attach Technology on 300-mm Monolithic Silicon Photonics Platform," 2020 IEEE Photonics Conference (IPC), 2020, pp. 1-2, doi: 10.1109/IPC47351.2020.9252280.

B. Peng et al., "A CMOS Compatible Monolithic Fiber Attach Solution with Reliable Performance and Self-alignment," in Optical Fiber Communication Conference (OFC) 2020, OSA Technical Digest (Optica Publishing Group, 2020), paper Th3l.4.

Y. Bian et al., "Monolithically integrated silicon nitride platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper Th1A.46.

A. Chowdhury et al., "High Performance Avalanche Photodiode in a Monolithic Silicon Photonics Technology," 2022 Optical Fiber Communications Conference and Exhibition (OFC), 2022, pp. 1-3.

A. Aboketaf et al., "Towards fully automated testing and characterization for photonic compact modeling on 300-mm wafer platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper W6A.1.

Nicholas R. Johnson et al., "Thermal atomic layer etching of crystalline GaN using sequential exposures of $XeF_2$ and $BCl_3$." Applied Physics Letters, vol. 114, Issue 24, Jun. 17, 2019; pp. 243103-1-243103-5; https://doi.org/10.1063/1.5095938.

J.R. Mileham et al., "Wet chemical etching of AlN." Applied Physics Letters, vol. 67, Jun. 4, 1998; pp. 1119-1121; https://aip.scitation.org/doi/10.1063/1.114980.

Zhenchuan Yang et al., "GaN on patterned silicon (GPS) technique for fabrication of GaN-based MEMS," The 13th International Conference on Solid-State Sensors, Actuators and Microsystems, 2005. Digest of Technical Papers. TRANSDUCERS '05., 2005, pp. 887-890 vol. 1, doi: 10.1109/SENSOR.2005.1496560.

Sandeep Kumar et al., "UV detector based on InAlN/GaN-on-Si HEMT stack with photo-to-dark current ratio > 107." Applied Physics Letters, vol. 111, Issue 25, 251103, Dec. 18, 2017; https://doi.org/10.1063/1.5004024.

Adesida, I., Youtsey, C., Ping, A.T. et al.; "Dry and Wet Etching for Group III-Nitrides. MRS Internet Journal of Nitride Semiconductor Research" 4 (Suppl 1), 38-48 (1999). https://doi.org/10.1557/S1092578300002222.

Rosenfeld, Adam et al., "Vertical Grating Structures Placed Between a Waveguide Core and a Substrate" filed on Jun. 2, 2022 as a U.S. Appl. No. 17/831,065.

Levy, Mark D. et al., Device Over Patterned Buried Porous Layer of Semiconductor Material Filed on Jun. 29, 2022 as a U.S. Appl. No. 17/852,873.

European Patent Office, Extended European Search Report and Opinion issued in European Patent Application No. 23202872.0 on Apr. 5, 2024; 13 pages.

\* cited by examiner

COMPOUND-SEMICONDUCTOR WAVEGUIDES WITH AIRGAP CLADDING

BACKGROUND

The disclosure relates to photonics chips and, more specifically, to structures for a waveguide and methods of forming a waveguide.

Photonics chips are used in many applications and systems including, but not limited to, data communication systems and data computation systems. A photonics chip integrates optical components and electronic components into a unified platform. Among other factors, layout area, cost, and operational overhead may be reduced by the integration of both types of components on the same chip.

A photonics chip may incorporate a laser including a compound semiconductor material, such as a III-V compound semiconductor material. The laser may be separately packaged and bonded to the photonics chip to provide cointegration. However, the coupling of light from the laser to a waveguide on the photonics chip may suffer because the waveguide is constructed from a different material than the laser.

Improved structures for a waveguide and methods of forming a waveguide are needed.

SUMMARY

In an embodiment of the invention, a structure comprises a substrate, a waveguide core comprising a compound semiconductor material, and a layer disposed on the substrate. The layer comprises the compound semiconductor material, and the layer includes a cavity positioned beneath the waveguide core.

In an embodiment of the invention, a structure comprises a substrate including a top surface and a cavity adjoining the top surface, and a layer on the top surface of the substrate. The layer, which comprises a compound semiconductor material, includes a first portion defining a waveguide core and a second portion surrounding the first portion. The waveguide core is positioned over the cavity.

In an embodiment of the invention, a method comprises forming a waveguide core from a layer comprising a compound semiconductor material. The layer is disposed on a substrate. The method further comprises forming a cavity in the layer that is positioned between the substrate and the waveguide core.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
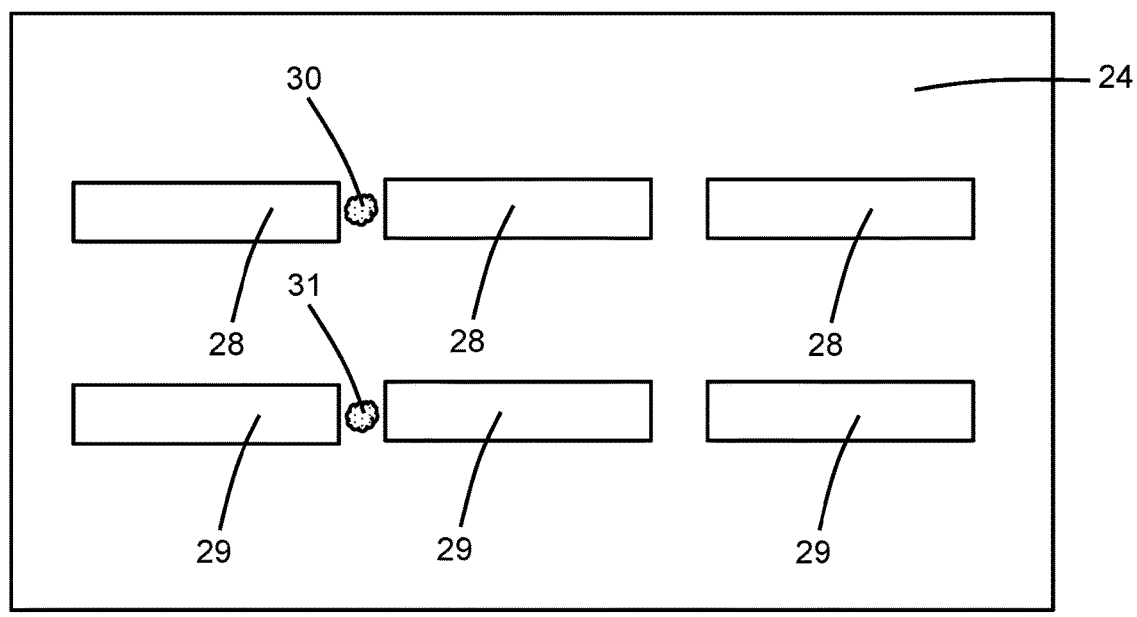
FIG. 1 is a top view of a structure at an initial fabrication stage in accordance with embodiments of the invention.
Figure 2:
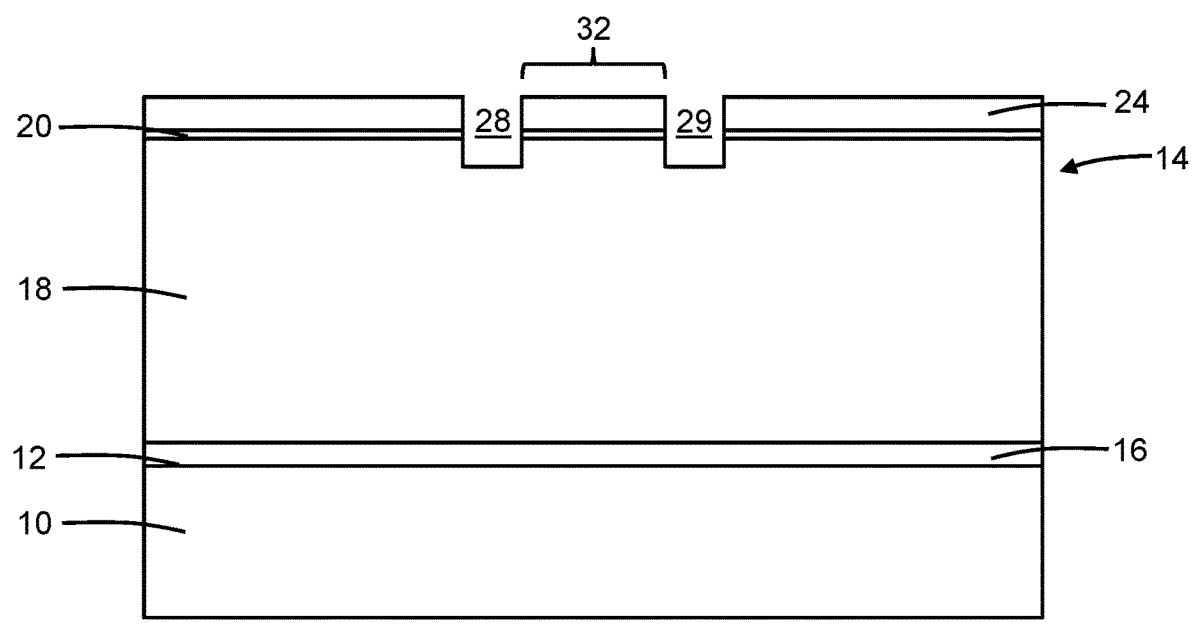
FIG. 2 is a cross-sectional view taken generally along line 2-2 in FIG. 1.

With reference to FIGS. 1, 2 and in accordance with embodiments of the invention, a layer stack 14 is formed on a top surface 12 of a substrate 10. The substrate 10 may be comprised of a single-crystal semiconductor material, such as single-crystal silicon. The substrate 10 may be a bulk substrate that contains a single-crystal semiconductor material (e.g., single-crystal silicon). In an embodiment, the single-crystal semiconductor material of the substrate 10 may have a diamond crystal lattice structure with a <111> crystal orientation as specified by Miller indices. In an embodiment, the substrate 10 may contain single-crystal silicon with a diamond crystal lattice structure having a <111> crystal orientation.

The layer stack 14 may include a seed layer 16, a semiconductor layer 18 on the seed layer 16, and a semiconductor layer 20 on the semiconductor layer 18. The semiconductor layers 18, 20, which are epitaxially grown from the seed layer 16, are each comprised of a compound semiconductor material. The seed layer 16, which provides a thin nucleation layer for the growth of the semiconductor layer 18, may be comprised of, for example, aluminum nitride. The semiconductor layers 18, 20 may be serially deposited using an epitaxial growth process, such as metalorganic chemical vapor deposition, vapor phase epitaxy, or molecular beam epitaxy, on the seed layer 16 to form the layer stack 14. In an embodiment, the thickness of the semiconductor layer 18 may be significantly greater than the thickness of the semiconductor layer 20. For example, the semiconductor layer 18 may have a thickness, for example, on the order of five microns.

The semiconductor layers 18, 20 may each have a crystal structure that is single crystal or, alternatively, a crystal structure that is substantially single crystal with varying levels of crystalline defectivity present. The semiconductor layer 18 may be comprised of a III-V compound semiconductor material, such as gallium nitride. A lower portion of the semiconductor layer 18 may provide a buffer layer that is tailored in terms of material composition, doping, layering, and/or layer thickness to accommodate lattice mismatch between the material of the substrate 10 and the material of the semiconductor layer 18 for improving the crystallinity of an upper portion of the semiconductor layer 18. The semiconductor layer 20, which is disposed over the upper portion of the semiconductor layer 18, may also be comprised of a III-V compound semiconductor material, such as gallium nitride. The semiconductor layer 22, which is disposed over the semiconductor layer 20, may contain a ternary III-V compound semiconductor, such as aluminum gallium nitride, that provides a heterogenous interface with the semiconductor layer 20 of different composition.

A dielectric layer 24 may be formed on the top surface of the layer stack 14 and patterned by lithography and etching processes to define openings that extend to the top surface of the layer stack 14. The dielectric layer 24 may be comprised of a dielectric material, such as silicon dioxide. Using the dielectric layer 24 as a hardmask, openings 28 and openings 29 are formed by an etching process that penetrate through the semiconductor layer 20 and into the semiconductor layer 18. The etching process may be an anisotropic etching process, such as a reactive ion etching process. The openings 28, 29 extend fully through the semiconductor layer 20 and partially through the semiconductor layer 18.

The openings 28, 29, which may adopt the shape of the openings in the dielectric layer 24, may be elongate with a length that is greater than their width. In an embodiment, the openings 28 may be longitudinally arranged in a row, and the openings 29 may be longitudinally arranged in a row that is parallel to the row including the openings 28. The openings 28, 29 define pilot holes for performing a subsequent etching process to further etch the semiconductor layer 20. Intact portions 30 of the semiconductor layers 18, 20 are positioned as bridges between adjacent pairs of the openings 28 and intact portions 30 of the semiconductor layers 20, 22 are positioned as bridges between adjacent pairs of the openings 29 in order to sustain mechanical support following the performance of the subsequent isotropic etching process. The row including the openings 28 is laterally spaced from the row including the openings 29. An intact portion 32 of the semiconductor layers 18, 20 is positioned in the space between the row including the openings 28 and the row including the openings 29. Each of the portions 30, 31 adjoins the portion 32 at one or the other of its sides.

In an embodiment, the openings 28 and the openings 29 may have a uniform pitch to define periodic arrangements. In an alternative embodiment, the openings 28 and the openings 29 may have a non-uniform pitch to define aperiodic arrangements. In an embodiment, the openings 28, 29 may be shaped as rectangular slots. In alternative embodiments, the openings 28, 29 may have a different patterned shape, such as oval slots or trapezoidal slots.

Figure 3:
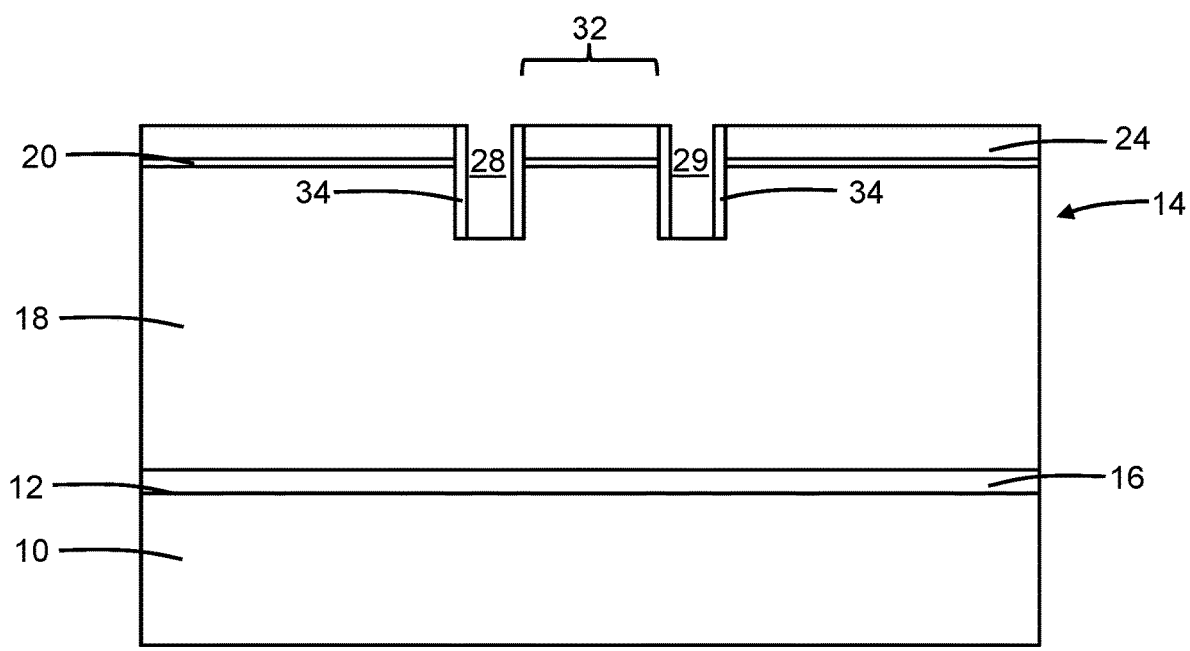
FIG. 3 is a cross-sectional view of the structure at a fabrication stage subsequent to FIG. 2.

With reference to FIG. 3 in which like reference numerals refer to like features in FIG. 2 and at a subsequent fabrication stage, a liner 34 may be formed on the sidewalls of the openings 28 and the sidewalls of the openings 29. The liner 34 may be comprised of a dielectric material, such as silicon dioxide, that is conformally deposited and etched by an anisotropic etching process. The liner 34 functions to mask and protect the portions 30, the portions 31, and the portion 32 of the semiconductor layers 18, 20 during a subsequent etching process.

Figure 4:
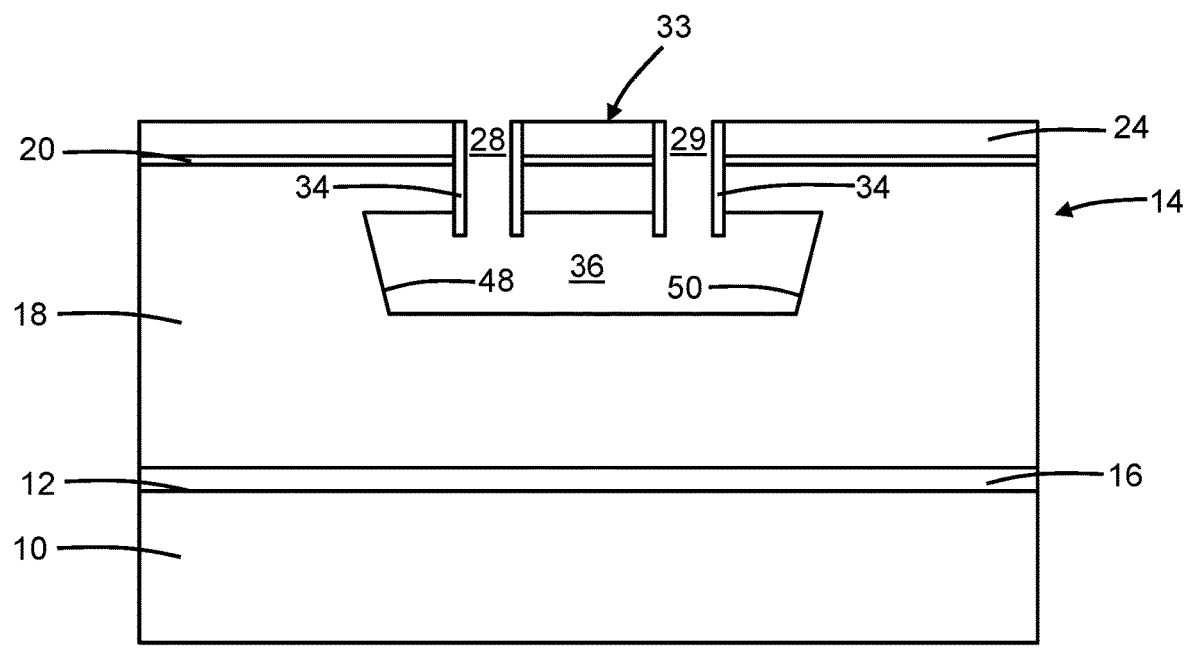
FIG. 4 is a cross-sectional view of the structure at a fabrication stage subsequent to FIG. 3.

With reference to FIG. 4 in which like reference numerals refer to like features in FIG. 3 and at a subsequent fabrication stage, a cavity 36 is formed in the semiconductor layer 18. The cavity 36 extends beneath the semiconductor layer 18 included in the portion 32 of the semiconductor layers 18, 20 laterally between the row of openings 28 and the row of openings 29 as an undercut. The formation of the cavity 36 undercuts the semiconductor layer 18 included in the portion 32 (FIG. 3) of the semiconductor layers 18, 20 laterally between the row of openings 28 and the row of openings 29 so as to define a waveguide core 33. The contribution of the semiconductor layer 20 to the waveguide core 33 may be negligible due to the significantly smaller thickness of the semiconductor layer 20 in comparison with the semiconductor layer 18.

A portion of the semiconductor layer 18 is positioned between the waveguide core 33 and the substrate 10. The cavity 36 may define low-index cladding that is disposed between the waveguide core 33 and the underlying portion of the semiconductor layer 18 and therefore also between the waveguide core 33 and the substrate 10. The portions 30 and the portions 31 of the semiconductor layers 18, 20, which are also undercut by the cavity 36, provide mechanical support for the waveguide core 33, and the waveguide core 33 is suspended above the cavity 36 by bars defined by the portions 30, 31.

The cavity 36 may include a sidewall 48 and an opposite sidewall 50 that are each inclined. In an embodiment, the distance between the sidewalls 48, 50 may decrease with increasing distance from the waveguide core 33 such that an upper portion of the cavity 36 is wider than a lower portion of the cavity 36 with the largest width occurring at the interface between the cavity 36 and the waveguide core 33. In an embodiment, the cavity 36 may be symmetrically positioned relative to the waveguide core 33.

The cavity 36 may be formed using a wet or dry etching process with the patterned dielectric layer 24 functioning as a hardmask. The openings 28 and openings 29 provide access to the semiconductor layer 18 for the etching process performed to form the cavity 36. The lengths, widths, and pitches of the openings 28, 29, as well as the process parameters for the etching process, may be adjusted to adjust the dimensions of the cavity 36. In an embodiment, the rows of openings 28, 29 may be aligned with a crystallographic plane or direction, such as the [10–1–2] direction, of the crystalline semiconductor material of the semiconductor layer 18. In an embodiment, the etching process forming the cavity 36 may exhibit a crystallographic orientation dependence in which the kinetics of the etching process may vary according to crystal plane and, in particular, may vary for different low-index crystal planes. Due to these variations in its kinetics, the etching process may form the angled sidewalls 48, 50 at the side edges of the cavity 36. In an embodiment, the etching process may be performed using a solution or vapor that includes phosphoric acid as an etchant.

Figure 5:
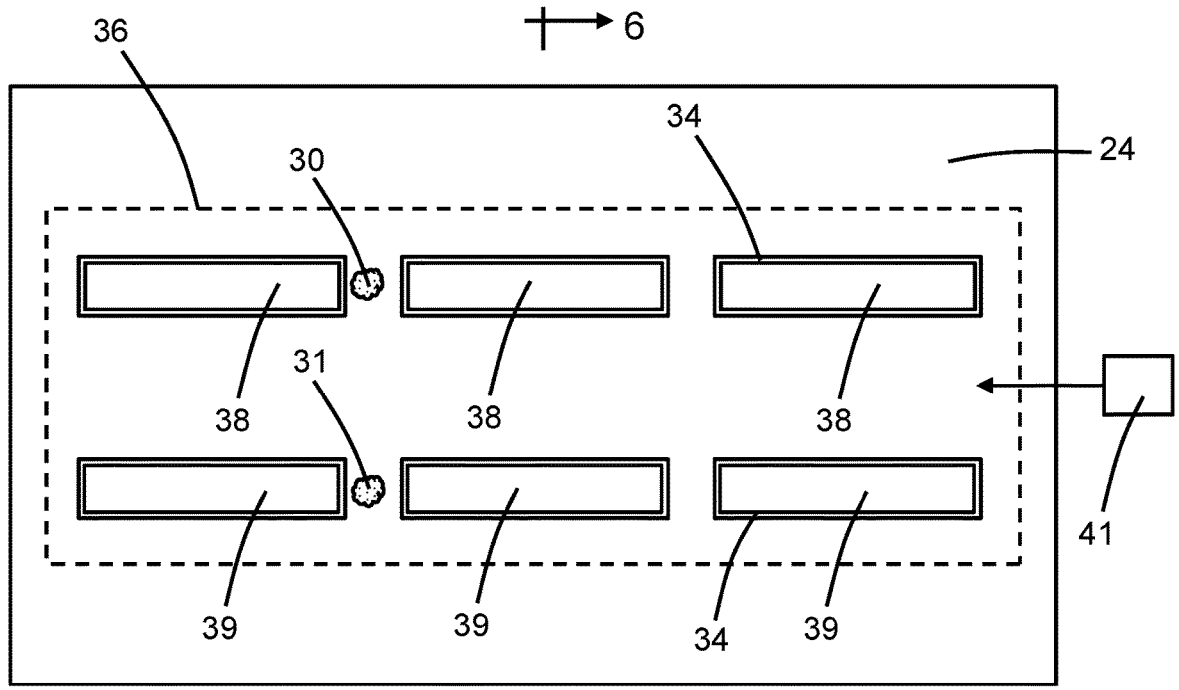
FIG. 5 is a top view of the structure at a fabrication stage subsequent to FIG. 4.
Figure 6:
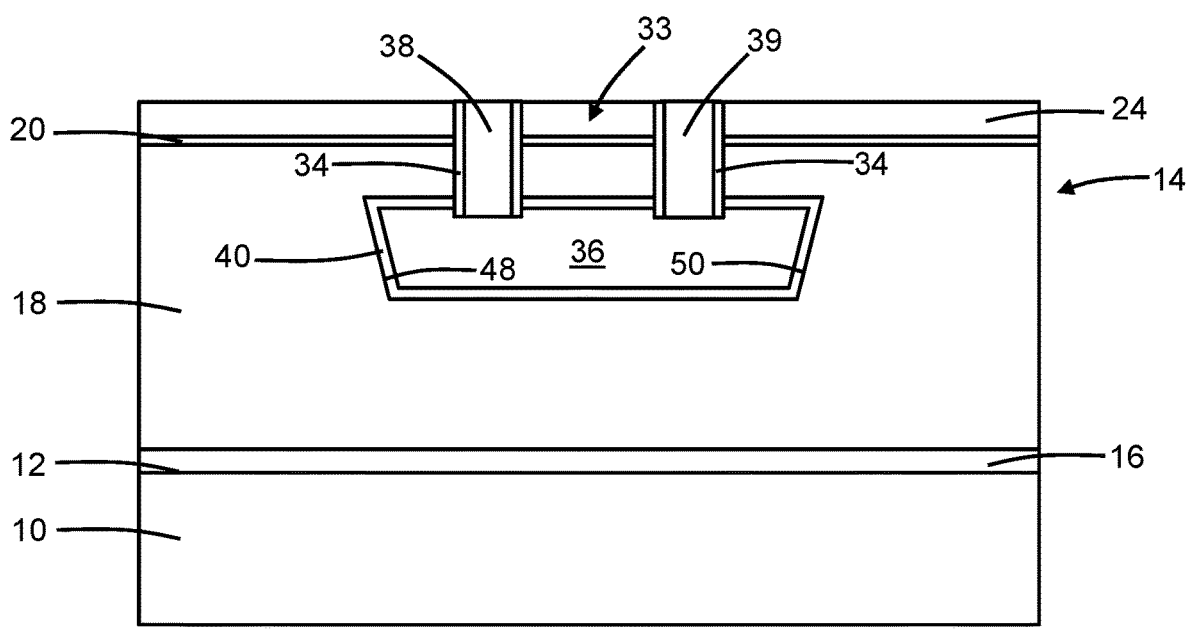
FIG. 6 is a cross-sectional view taken generally along line 6-6 in FIG. 5.

With reference to FIGS. 5, 6 in which like reference numerals refer to like features in FIG. 4 and at a subsequent fabrication stage, plugs 38, 39 are formed in the openings 28 and the openings 29 (FIG. 4). The plugs 38, 39 may be formed by depositing a dielectric layer by chemical vapor deposition and planarizing the dielectric layer by chemical-mechanical polishing. The plugs 38, 39 may be comprised of a dielectric material, such as silicon dioxide. A passivation layer 40 comprised of the deposited dielectric material may form on surfaces bordering the cavity 36 and surround the sealed cavity 36 before the opening 28, 29 are obstructed. The plugs 38 alternate with the portions 30 of the semiconductor layers 18, 20 in the row including the openings 28, and the plugs 39 alternate with the portions 31 of the semiconductor layers 18, 20 in the row including the openings 29.

The plugs 38, 39 may fully obstruct each of the openings 28, 29 in order to block the openings 28, 29. After forming the plugs 38, 39, the cavity 36 may be considered to be sealed to define an airgap that may contain atmospheric air at or near atmospheric pressure, may contain another gas at or near atmospheric pressure, or may contain atmospheric air or another gas at a sub-atmospheric pressure (e.g., a partial vacuum). The airgap defined by the sealed cavity 36 may be characterized by a permittivity or dielectric constant of near unity (i.e., vacuum permittivity), which is less than the dielectric constant of a solid dielectric material. The refractive index of the sealed cavity 36, which is proportional to the dielectric constant, is significantly lower than the refractive index of solid dielectric material.

The airgap provided by the sealed cavity 36 is positioned in the substrate 26 beneath waveguide core 33 such that the waveguide core 33 overlaps with the cavity 36. In an embodiment, the waveguide core 33 may be centered over the sealed cavity 36. The dielectric material of the plugs 38, 39 and the airgap provided by the cavity 36 may be characterized by a lower refractive index than the waveguide core 33, which promotes the guiding of propagating light by the waveguide core 33. The portions of the semiconductor layers 18, 20 and the plugs 38, 39 are positioned in a vertical direction over the cavity 36.

The waveguide including the waveguide core 33 and the cladding provided by the cavity 36 and plugs 38, 39 may be co-integrated with a device 41, such as a laser or semiconductor optical amplifier, that is comprised of one or more III-V semiconductor materials and attached to the photonics chip. In an embodiment, the device 41 may be a laser that includes a layer stack similar or identical to the layer stack 14 and that is powered to generate light, as indicated by the single-headed arrow, coupled to the waveguide. The combination of the waveguide core 33 comprised of one or more compound semiconductor materials and the air gap provided by the sealed cavity 36 may be tailored to provide a unique mode profile for the light received from the device 41. For example, the mode propagating in the waveguide core 33 may have a profile tailored to produce a reduced overlap with the waveguide sidewalls, which may reduce light loss.

Figure 7:
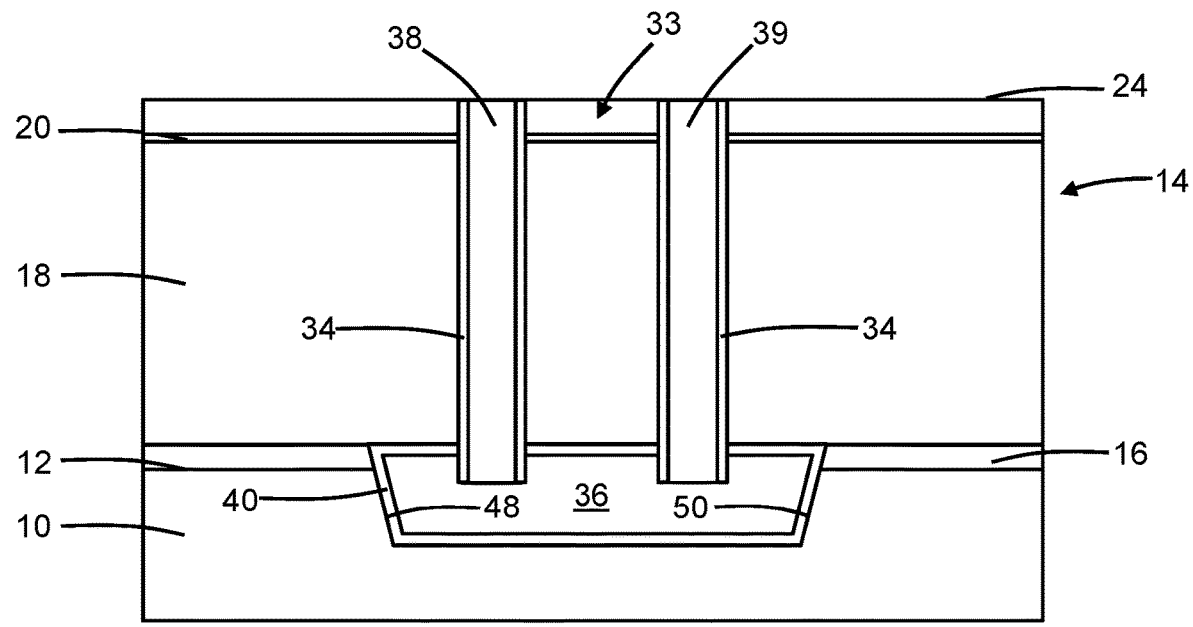
FIG. 7 is a cross-sectional view of a structure in accordance with alternative embodiments of the invention.

With reference to FIG. 7 and in accordance with alternative embodiments, the cavity 36 may be formed at a greater depth such that the cavity 36 includes a portion that is positioned in the substrate 10. In an embodiment, the cavity 36 may also include a portion that is located in the seed layer 16. To form the cavity 36 at a deeper location, the openings 28, 29 may be extended to penetrate fully through the semiconductor layer 18, and an isotropic etching process may be employed to etch the substrate 10 and the seed layer 16. The isotropic etching process includes a lateral etching component that deepens the cavity 36 and a vertical etching component that widens the cavity 36.

In an embodiment, the cavity 36 may be formed using a selective etching process that removes the material of the substrate 10 and the material of the seed layer 16 selective to the material of the semiconductor layer 18 such that the cavity 36 adjoins the semiconductor layer 18. As used herein, the term "selective" in reference to a material removal process (e.g., etching) denotes that, with an appropriate etchant choice, the material removal rate (i.e., etch rate) for the targeted material is greater than the removal rate for at least another material exposed to the material removal process. In an embodiment, the etching process may be performed using a solution or vapor that includes potassium hydroxide as an etchant, which may etch the [100] direction of the semiconductor material (e.g., silicon) of the substrate 10 at a higher rate than the [111] direction.

Figure 8:
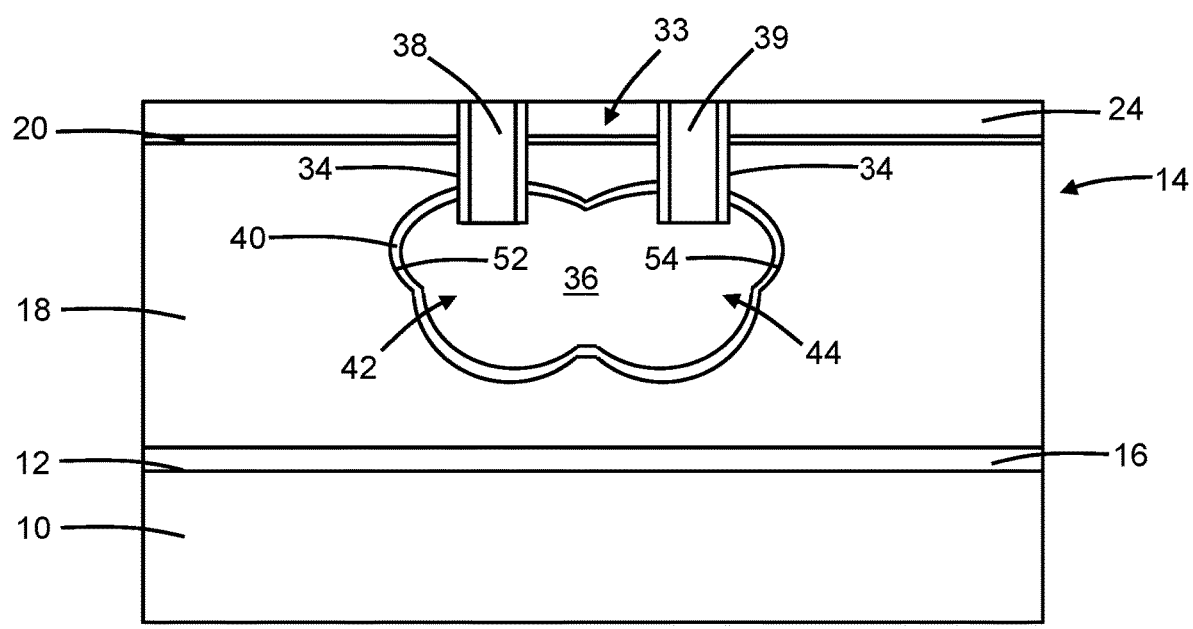
FIG. 8 is a cross-sectional view of a structure in accordance with alternative embodiments of the invention.

With reference to FIG. 8 and in accordance with alternative embodiments, the cavity 36 may include a chamber 42 and a chamber 44 that is connected to the chamber 44. The chamber 42 is in communication with the openings 28, the chamber 44 is in communication with the openings 29, and the chambers 42, 44 may merge during the etching process used to form the cavity 36. The chamber 42 has a sidewall 52 and the chamber 44 has a sidewall 54. Each of the sidewalls 52, 54 is rounded or curved, each of the sidewalls 52, 54 may include multiple curvatures, and the sidewalls 52, 54 converge beneath the waveguide core 33 defining cusps at the upper and lower intersections of the respective arcs. In an embodiment, the cusps of the sidewalls 52, 54 bordering the upper portion of the cavity 36 may have a higher curvature than the cusps of the sidewalls 52, 54 bordering the lower portion of the cavity 36.

In an embodiment, the semiconductor layer 18 may include a dopant, such as aluminum, that is graded with a concentration that decreases with increasing distance from the substrate 10 and seed layer 16. In an embodiment, the cavity 36 may be formed using an etching process having an etch rate that varies with the composition of the compound semiconductor material contained in the semiconductor layer 18. In an embodiment, the etching process may be performed using a solution or vapor that includes potassium hydroxide and ethylene glycol as an etchant, and the etching rate may increase with increasing distance from the substrate 10 such that an upper portion of the cavity 36 is wider than a lower portion of the cavity 36.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
 a substrate;
 a waveguide core comprising a first III-V compound semiconductor material;
 a layer on the substrate, the layer comprising the first III-V compound semiconductor material, and the layer including a cavity positioned beneath the waveguide core, a first plurality of openings extending through the layer to the cavity, and a second plurality of openings extending through the layer to the cavity;
 a first plurality of plugs in the first plurality of openings, the first plurality of plugs configured to obstruct the first plurality of openings; and
 a second plurality of plugs in the second plurality of openings, the second plurality of plugs configured to obstruct the second plurality of openings,
 wherein the waveguide core is laterally positioned between the first plurality of openings and the second plurality of openings, and the first plurality of plugs and the second plurality of plugs comprise a dielectric material.

2. The structure of claim 1 wherein the first III-V compound semiconductor material comprises gallium nitride.

3. The structure of claim 1 wherein the cavity adjoins the waveguide core.

4. The structure of claim 1 wherein the waveguide core is centered over the cavity.

5. The structure of claim 1 wherein the layer includes a portion positioned between the cavity and the substrate.

6. The structure of claim 1 wherein the cavity includes a sidewall, and further comprising:
 a passivation layer comprised of the dielectric material, wherein the passivation layer is arranged inside the cavity on the sidewall.

7. The structure of claim 1 wherein the first plurality of openings are arranged in a first row and the second plurality of openings are arranged in a second row, and the first row and the second row are aligned with a crystallographic direction of the first III-V compound semiconductor material.

8. The structure of claim 1 wherein the layer comprises a dopant having a concentration that varies with increasing distance from the substrate.

9. The structure of claim 1 wherein the cavity has a trapezoidal shape with inclined sidewalls, and the cavity has a width that increases with decreasing distance from the waveguide core.

10. The structure of claim 1 wherein the cavity includes a first chamber and a second chamber that adjoins the first chamber, the first chamber has a first sidewall with multiple curvatures, and the second chamber has a second sidewall with multiple curvatures.

11. The structure of claim 10 wherein the layer comprises a dopant having a concentration that decreases with increasing distance from the substrate.

12. A structure comprising:
 a substrate including a top surface and a cavity adjoining the top surface;
 a layer on the top surface of the substrate, the layer comprising a III-V compound semiconductor material, and the layer including a first portion defining a waveguide core, a second portion surrounding the first portion, a first plurality of openings extending through the layer to the cavity, and a second plurality of openings extending through the layer to the cavity, and the waveguide core positioned over the cavity;
 a first plurality of plugs in the first plurality of openings, the first plurality of plugs configured to obstruct the first plurality of openings; and
 a second plurality of plugs in the second plurality of openings, the second plurality of plugs are configured to obstruct the second plurality of openings,
 wherein the waveguide core is laterally positioned between the first plurality of openings and the second plurality of openings, and the first plurality of plugs and the second plurality of plugs comprise a dielectric material.

13. A method comprising:
 forming a waveguide core from a layer comprising a first III-V compound semiconductor material;
 forming a cavity in the layer that is positioned between the waveguide core and a substrate;
 forming a first plurality of openings extending through the layer to the cavity;
 forming a second plurality of openings extending through the layer to the cavity;
 forming a first plurality of plugs in the first plurality of openings, wherein the first plurality of plugs are configured to obstruct the first plurality of openings; and
 forming a second plurality of plugs in the second plurality of openings, wherein the second plurality of plugs are configured to obstruct the second plurality of openings,
 wherein the waveguide core is laterally positioned between the first plurality of openings and the second plurality of openings, and the first plurality of plugs and the second plurality of plugs comprise a dielectric material.

14. The structure of claim 1 further comprising:
 a laser on the substrate, the laser including a layer stack comprising a second III-V compound semiconductor material, and the laser configured to generate light that is coupled to the waveguide core.

15. The structure of claim 12 wherein the III-V compound semiconductor material comprises gallium nitride.

16. The structure of claim 12 wherein the first plurality of openings are arranged in a first row and the second plurality of openings are arranged in a second row, and the first row and the second row are aligned with a crystallographic direction of the III-V compound semiconductor material.

17. The structure of claim 16 wherein the crystallographic direction of the III-V compound semiconductor material is a [10–1–2] direction.

18. The structure of claim 12 wherein the cavity has a trapezoidal shape with inclined sidewalls, and the cavity has a width that increases with decreasing distance from the waveguide core.

19. The structure of claim 12 wherein the cavity includes a first chamber and a second chamber that adjoins the first chamber, the first chamber has a first sidewall with multiple curvatures, and the second chamber has a second sidewall with multiple curvatures.

20. The structure of claim 7 wherein the crystallographic direction of the first III-V compound semiconductor material is a [10–1–2] direction.

* * * * *